Nov. 8, 1966    H. J. PINKOWSKI    3,283,449
PROCESS OF SHARPENING INSERT BLADE FOR ROTARY CUTTER
Filed March 12, 1964
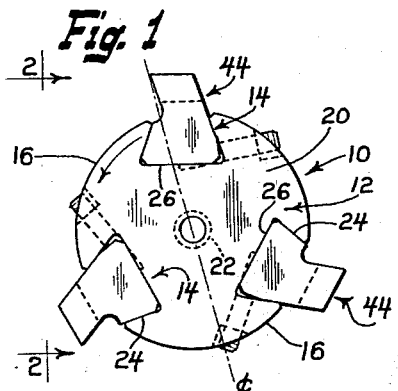
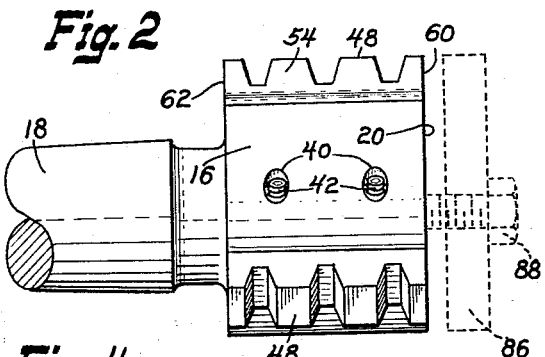
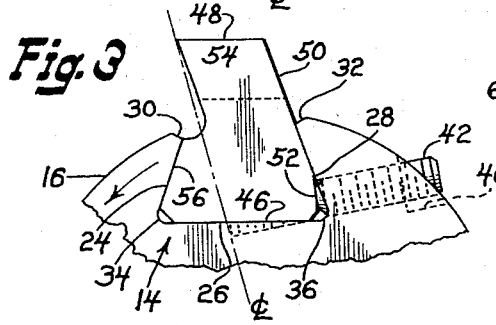
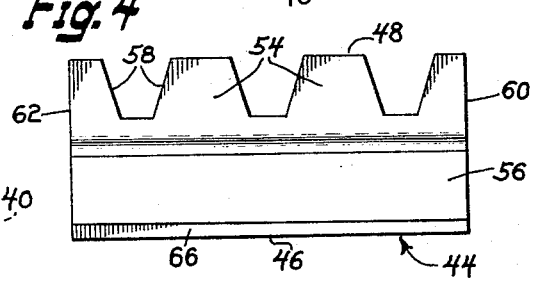
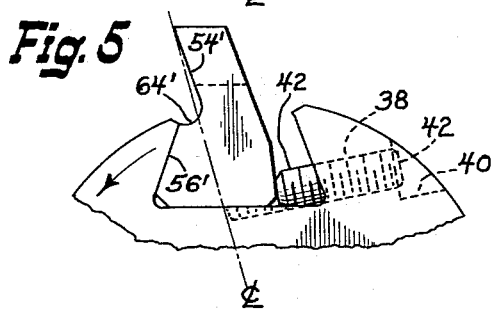
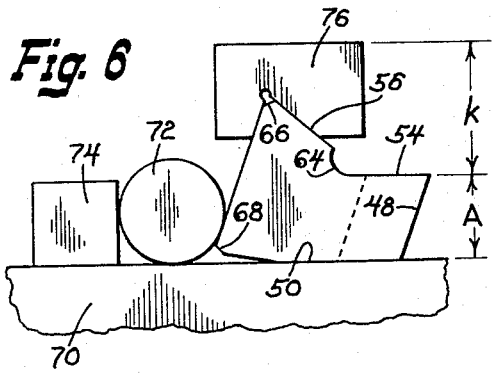
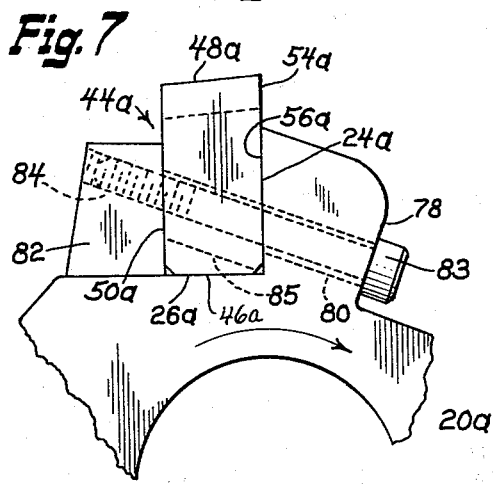
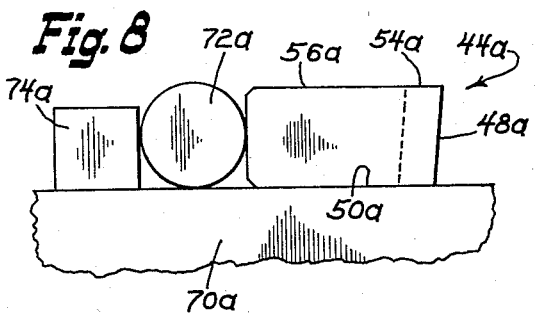
INVENTOR.
Henry J. Pinkowski
BY
His Att'y

United States Patent Office 3,283,449
Patented Nov. 8, 1966

3,283,449
PROCESS OF SHARPENING INSERT BLADE
FOR ROTARY CUTTER
Henry J. Pinkowski, Chicago, Ill., assignor to Illinois Tool
Works Inc., Chicago, Ill., a corporation of Delaware
Filed Mar. 12, 1964, Ser. No. 351,451
5 Claims. (Cl. 51—288)

This invention relates in general to insert blade cutters and more particularly relates to insert blade cutters having a form and method of sharpening same.

While insert blade cutters of various types have been known for many years, they have not found acceptance for high precision work where a form is to be cut into a workpiece. By high precision work it is meant where tolerance relationships are measured in terms of tenths of thousands of an inch (.0001–.0009 inch). A major problem encountered with prior art devices relates to the problem of sharpening the insert blades and reassembling the blades after sharpening in the same precision relationship so that the tool will give an identical form cut in the workpiece after sharpening.

It is an object of this invention to provide a method of sharpening a cutter insert which is exceedingly simple and which may be readily accomplished on standard commercial equipment while providing high precision results.

The novel features that are characteristic of the invention are set forth with particularity in the appended claims. The invention itself, however, both as to its organization and the method of operation together with additional objects and advantages thereof will be best understood by the following description of specific embodiment when read in connection with the accompanying drawings in which:

FIG. 1 is a side elevational view of a high precision insert type form cutter embodying my concepts;

FIG. 2 is a front elevational view of the cutter shown in FIG. 1;

FIG. 3 is an enlarged fragmentary view of a portion of FIG. 1;

FIG. 4 is a front elevational view of an insert in detached relationship from the cutter body;

FIG. 5 is a view similar to FIG. 3 showing the relative position of the parts after sharpening thereof;

FIG. 6 is a semidiagrammatic view indicating sharpening procedures for the insert shown in FIG. 4;

FIG. 7 is a partial view similar to FIG. 3 of another embodiment of insert and means of mounting thereof; and FIG. 8 is a view similar to FIG. 6 showing the grinding method for the insert shown in FIG. 7.

A high precision form cutter 10 is shown in FIG. 1 and essentially comprises a cutter body means 12 having a plurality of channels 14 in the periphery 16 for receipt of insert blade means 44.

The cutter body means 12 may be formed with an integral shank portion 18 of any suitable design, the surface 20 of the body means 12 (right hand side as viewed in FIG. 2) preferably being a ground surface of high precision disposed at right angles to the axis of the shank and the body means 12. A threaded aperture 22 is centrally located in the body means 22 on surface 20 for receipt of a bolt 88 which mounts a mounting plate 86 which is used only during initial assembly of the cutter insert blade means 44 as shall become apparent, and is removed prior to use of the cutter.

The individual channel means 14 formed in the body means 12 have two precision surfaces extending along the length thereof, namely, reference surface means 24 and base surface means 26. Each of the surfaces 24 and 26 are very precisely disposed in the cutter body at a predetermined angle to each other and to the central axis and each of the channels have identical surfaces symmetrically arranged to each other and to the central axis.

Surface 24 and surface 26 are the reference surfaces that play the key part in locating the insert means 44 both originally and after every sharpening. Surfaces 24 and 26 have a relative angularity to each other in the range of 45° to 100° and preferably in the range of 65° to 90°. Channel surface 28 is not critical to the design other than being spaced from surface 24 sufficient distance to afford disposal of the insert within the channel means 14. The body stock intermediate surface 28 in the periphery of the body provides back up stock for a clamp arrangement to force the insert into intimate contact with surfaces 26 and 24. In accordance with good manufacturing techniques, intersecting sharp surfaces and corners are preferably broken as shown at 30, 32, 34 and 36.

The body means 12 is formed with a plurality of channel intersecting bores 38, there preferably being two such bores associated with each channel means 14 as shown in FIG. 2 for receipt of threaded set screw members 42 which cooperate with the bores 38 to clamp the insert means 44 therein in their relative positions. The body means 12 may have countersunk apertures 40 adjacent bores 38 to permit ease of adjustment of the set screw members 42.

The individual insert means 44 are each formed with a precision ground base surface 46, a top surface 48 and an angularly disposed connecting precision surface 50 which may be denominated grinder reference surface. A short portion of surface 50 adjacent surface 26 may be slightly chamfered as shown at 52 for better coaction with the end of the set screw 42 if desired. Face surface 54 of the insert is also a precision surface and is preferably disposed parallel to grinder reference surface 50 which greatly aids in sharpening of the insert for purposes hereinafter appearing. Surface 56 on the face side of the insert is disposed below face surface 54 and is coextensive therewith for precision location engagement with the body surface 24 for locating the face 54 in a precision relationship to the axis of the cutter body. It will be noted that the face surface 54 has a form thereto as shown at 58. In the particular cutter insert 44, it will be noted that the top surface 48 and base surface 46 are parallel to each other, it therefore logically follows that if ten thousandths of an inch is removed from face surface 54 and ten thousandths of an inch is removed from surface 56 while maintaining angularity therebetween, to give new surfaces 54′ and 56′ (see FIG. 5) the same relative location of the cutting edges will obtain relative to a workpiece.

FIG. 5 shows a cutter insert which has had considerably more than ten thousandths of an inch ground away yet the relative location of the surfaces 58, 54, and 48 are maintained even after such severe sharpening. By maintaining precisely located surfaces 24 and 26 on the cutter body means 12 and by always removing an identical amount of stock from surfaces 54 and 56 while maintaining angularity therebetween, the cutter insert blade may be sharpened until such time as they are too weak to withstand the forces encountered in cutting the work. The geometry automatically provides a relief for the cutting action and long and useful tool life with a great plurality of sharpenings is provided by this construction.

The sharpening of the cutter insert blade means 44 is a simple procedure merely requiring that the cutter insert be located on a magnetic holder 70 in a standard surface grinder with surface 50 being disposed on the holder 70. A cylindrical block means 72 may be interposed between the cutter and the fixed portion 74 of the holder bed for clearance purposes the grinding wheel merely passing across surface 54 to remove stock from the face thereof. An identical amount of stock is then removed from surface 56, a gauge block 76 being shown for maintaining the same angularity. If desired the fillet 64 may be reground after a number of sharpenings although this is a manufacturing convenience. No other surfaces of the insert other than surfaces 54 and 56 are ground, hence the same angular relationships will always be maintained. The simplicity of the grinding operation for sharpening will be immediately apparent and the movement of the set screw 42 against the chamber surface 52 does not change any precision relationships. In remounting the inserts 44 after sharpening thereof, a precision adapter plate 86 having a ground surface may be attached to surface 20 by the bolt 88, said plate 86 having a diameter of sufficient size so as to engage surface 60 on each of the inserts. By merely tapping surfaces 62 of all of the inserts firmly against the plate means 86, the inserts will be reassembled in precision relationship to each other in the axial plane of the cutter body, whereupon the screws 42 are retightened and the faces of the cutter inserts are correctly aligned.

Another embodiment of the invention is shown in FIG. 7 and similar parts will be identified with similar reference numerals with the addition of the suffix "a." Only the different portions of this construction will be discussed. It will be noted that the insert means 44a differs from insert 44 in that surface 54a and 56a, the face and the cutter engaging front locating surfaces respectively, are coextensive and are in an identical plane. Thus only a single grinding operation is necessary for this insert. However, after sharpening, the diametral distance of surface 48a and the cutting surface 54a will change, since the surface 24a is located in a diametral plane and surface 26a is at right angles thereto. It will be noted that the form presented to the workpiece will be identical after every sharpening. In this particular embodiment, the clamp means is in the form of an aperture 80 in a boss 78 of the cutter body which mounts a bolt 86 which extends through a suitable aperture 85 in the insert 44a to engage a threaded aperture 84 in a clamping block member 82. If it is desired to not only maintain form but also to maintain same diametral extent of the form from the axis of the cutter, then surface 24a of the body may be shifted to the right as viewed in FIG. 7 and surface 48a may then be made parallel with surface 46a of the insert, the amount of surface 24a is shifted to the right determining the amount of relief given to the cutting edges, rather than placing the relief directly on the cutter insert as shown.

Of major importance in both mountings and sharpening operations of both inserts is the extreme simplicity of maintaining precision relationships and the extreme ease with which the grinding operation may be accomplished. No complicated figures are required and no complicated back off grinding is required. Each of the inserts has a substantial sharpening life.

Although various embodiments of the invention have been described, it is with full awareness that many modifications thereof are possible. Various modifications, adaptations, and alterations may be applied to the specific form shown to meet the requirements of practice without in any manner departing from the spirit and/or scope of the present invention and all such modifications, adaptations, and alterations are contemplated to come within the spirit and scope of the appended claims.

What is claimed as the invention is:

1. A method of sharpening a polygonal in cross section cutter insert blade providing a form cutting edge and having a base surface and a generally opposed top surface, a grinding reference surface intermediate said base and top surfaces and a face surface generally opposed to said reference surface, said cutter insert blade further having a cutter reference surface adjacent said face surface and on the side opposite to said grinding reference surface comprising the steps of disposing said cutter insert blade on the grinding reference surface thereof, relatively moving a grinding wheel to the face surface of said cutter insert blade to sharpen same and relatively moving the cutter reference surface to the grinding wheel to remove the same depth of material from the cutter reference surface whereby reorientation of said cutter insert blade on a cutter by location on said cutter reference surface will present an identical form for cutting a workpiece.

2. The method set forth in claim 1 wherein the face of the cutter insert blade is ground parallel to the grinding reference surface.

3. The method set forth in claim 1 wherein the cutter reference surface and the face of the cutter insert blade are coextensive and are ground in a single grinding operation.

4. The method set forth in claim 1 wherein the cutter reference surface and the face are angularly disposed relative to each other and are ground in two separate operations, the amount of metal removal as measured transversely to each surface being the same.

5. The method set forth in claim 1 wherein the grinding reference surface on the cutter insert blade is disposed on a magnetic holder.

References Cited by the Examiner

UNITED STATES PATENTS 2,536,864   1/1951   Strickland et al. _____ 51—288

FOREIGN PATENTS 675,005   4/1939   Germany.

LESTER M. SWINGLE, *Primary Examiner.*